United States Patent [19]

Ueda et al.

[11] Patent Number: 4,965,504

[45] Date of Patent: Oct. 23, 1990

[54] CONTROL APPARATUS FOR INVERTER FOR DRIVING AC MOTOR

[75] Inventors: Shigeta Ueda, Hitachi; Kazuo Honda, Hitachiota; Takashi Ikimi, Hitachi; Toshihiko Matsuda, Hitachi; Hiroshi Nagase, Hitachi; Nobuyoshi Mutoh, Katsuta, all of Japan

[73] Assignee: Hitachi, Ltd., Tokyo, Japan

[21] Appl. No.: 406,516

[22] Filed: Sep. 13, 1989

[30] Foreign Application Priority Data

Sep. 20, 1988 [JP] Japan .................................. 63-233619

[51] Int. Cl.$^5$ ............................................ H02P 7/42
[52] U.S. Cl. ...................................... 318/802; 318/808; 318/727; 318/811; 363/41; 363/37; 361/23
[58] Field of Search ................................ 318/727–819; 361/21–34; 363/41–43, 34, 35, 37

[56] References Cited

U.S. PATENT DOCUMENTS

| | | | |
|---|---|---|---|
| 4,467,260 | 8/1984 | Mallick, Jr. et al. | 361/23 |
| 4,470,092 | 9/1984 | Lombardi | 361/23 |
| 4,532,464 | 7/1985 | Igarashi et al. | 318/807 |
| 4,629,959 | 12/1986 | Okuyama et al. | 318/802 X |
| 4,680,526 | 7/1987 | Okuyama et al. | 318/808 X |
| 4,862,343 | 8/1989 | Nomura et al. | 318/811 X |

OTHER PUBLICATIONS

1986 National Conventional Record, IEE of Japan Nos. 535, 536, pp. 625–626.
1988 National Convention Record, IEE of Japan, No. 523, pp. 619–620.
1988 National Convention Record, Industry Application IEE of Japan, No. 74, pp. 339–342.

Primary Examiner—William M. Shoop, Jr.
Assistant Examiner—Paul Ip
Attorney, Agent, or Firm—Antonelli, Terry, Stout & Kraus

[57] ABSTRACT

A control apparatus for controlling a PWM inverter, the PWM inverter receiving AC power and generating an AC output having a controlled frequency to be supplied to an AC motor, comprises a circuit for generating, on the basis of a given running command, a PWM signal controlling the inverter with a given sampling period, and a circuit for controlling the PWM signal generating circuit, whereby the AC motor generates an electromagnetic tone preselected so as to correspond to desired information when the AC motor is driven by output of the inverter controlled by the PWM signal. The above described desired information may be information representing the running state of the motor or selected music.

22 Claims, 13 Drawing Sheets

{ 1: CONDUCTION STATE OF POSITIVE SIDE DEVICE
  0: CONDUCTION STATE OF NEGATIVE SIDE DEVICE

DATA TABLE

| SAMPLING PERIOD | DURATION |
|---|---|
| $T_{S1}$ | $L_1$ |
| $T_{S2}$ | $L_2$ |
| $T_{S3}$ | $L_3$ |
| $\vdots$ | $\vdots$ |
| $T_{Sn}$ | $L_n$ |

| MUSICAL INTERVAL | FREQUENCY RATIO | FREQUENCY | SAMPLING PERIOD Ts |
|---|---|---|---|
| A (LA) | 1 | 440.0 Hz | 2.27 ms |
| A#, Bb | 2^(1/12) | 466.2 | 2.15 |
| B (SI) | 2^(2/12) | 493.9 | 2.02 |
| C (DO) | 2^(3/12) | 523.3 | 1.91 |
| C#, Db | 2^(4/12) | 554.4 | 1.80 |
| D (RE) | 2^(5/12) | 587.3 | 1.70 |
| D#, Eb | 2^(6/12) | 622.3 | 1.61 |
| E (MI) | 2^(7/12) | 659.3 | 1.52 |
| F | 2^(8/12) | 698.5 | 1.43 |
| F#, Gb | 2^(9/12) | 740.0 | 1.35 |
| G (SOL) | 2^(10/12) | 784.0 | 1.28 |
| G#, Ab | 2^(11/12) | 830.6 | 1.20 |
| A (LA) | 2 | 880.0 | 1.14 |

F I G. 16
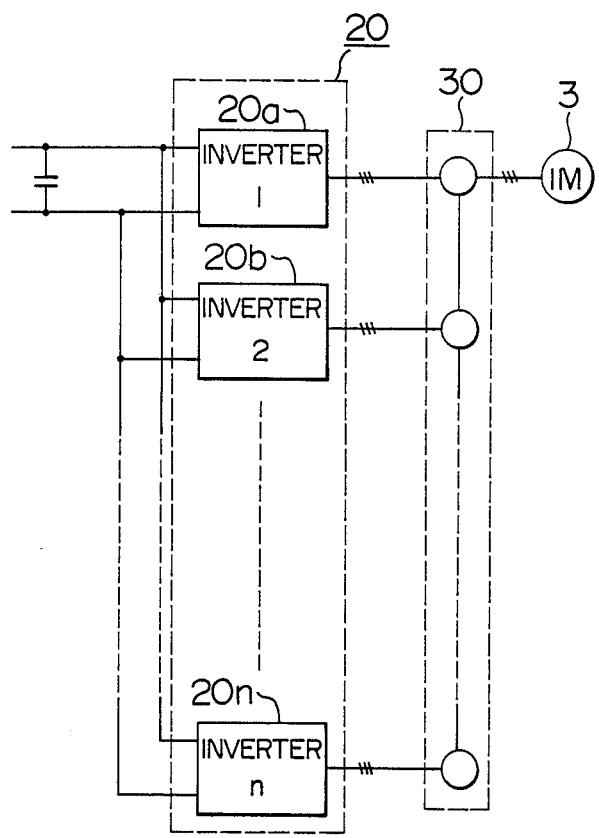
F I G. 17
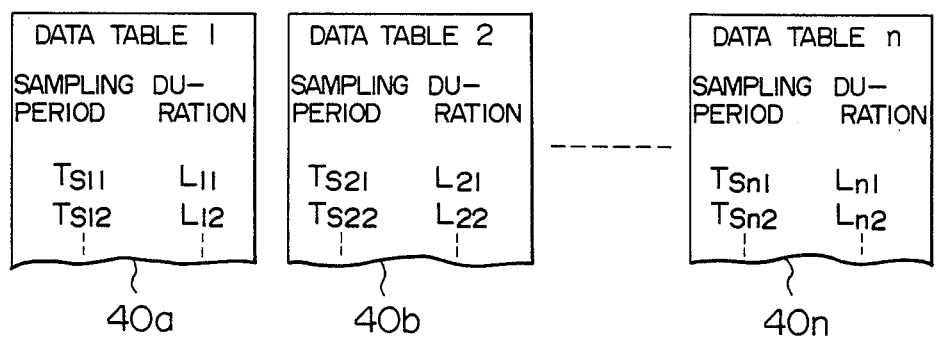

CONTROL APPARATUS FOR INVERTER FOR DRIVING AC MOTOR

BACKGROUND OF THE INVENTION

The present invention relates to a control apparatus of an inverter for driving an AC motor, and in particular to a control apparatus capable of effectively using electromagnetic vibration tones, i.e., noises generated from an AC motor such as an induction motor or a synchronous motor driven by a PWM inverter.

As conventional countermeasures to noises generated from an AC motor driven by a PWM inverter, there are known a scheme in which the sampling frequency of the PWM inverter is raised up to the nonaudible frequency region and another scheme in which noises are changed to be white noises by changing the sampling frequency of the PWM inverter so that it may not concentrate to an identical frequency. The former scheme is described in 1986 National Convention Record, IEE of Japan, Nos. 535 and 536, pp. 625 to 626, for example. The latter scheme is described in 1988 National Convention Record, IEE of Japan, No. 523, pp. 619 to 620, for example.

Upon occurrence of overcurrent, overspeed or abnormal state in a motor, this abnormal state is generally detected and displayed on a display device or informed of by means of an alarm device.

In the former scheme among the above described conventional countermeasures to noises, attention is not paid to occurrence of high frequency noises caused by raising the sampling frequency, resulting in a problem of radio wave trouble. The latter scheme has a problem that noises offensive to the car still remain because the total pressure level of noises is not changed even if noises are made to be white.

When an abnormal state of a motor is to be informed of, it is necessary to provide a display device or an alarm device in case of the prior art, resulting in a problem of an increase of the apparatus by that amount.

SUMMARY OF THE INVENTION

An object of the present invention is to make electromagnetic vibration tones generated by an AC motor nonoffensive to the ear.

Another object of the present invention is to inform of an abnormal state or the like of an AC motor by using electromagnetic vibration tones generated from the AC motor.

The above described objects of the present invention are achieved by, in a system in which the output of an AC power supply is supplied to an AC motor via a PWM inverter, changing the frequency of current ripple contained in the motor current according to an information tone to be generated as the electromagnetic vibration tone of the AC motor.

As a result of changing the ripple frequency of a current contained in the motor current according to the desired information tone, the electromagnetic tone generated from the motor serves as an information tone, and it becomes nonoffensive to the ear and can be used as an alarm tone or the like.

BRIEF DESCRIPTION OF THE DRAWINGS

FIGS. 16 to 18 are configuration diagrams showing the case where the present invention is applied to a multi-inverter apparatus.

DESCRIPTION OF THE PREFERRED EMBODIMENTS

Preferred embodiments of the present invention will now be described by referring to drawings.

Figure 1:
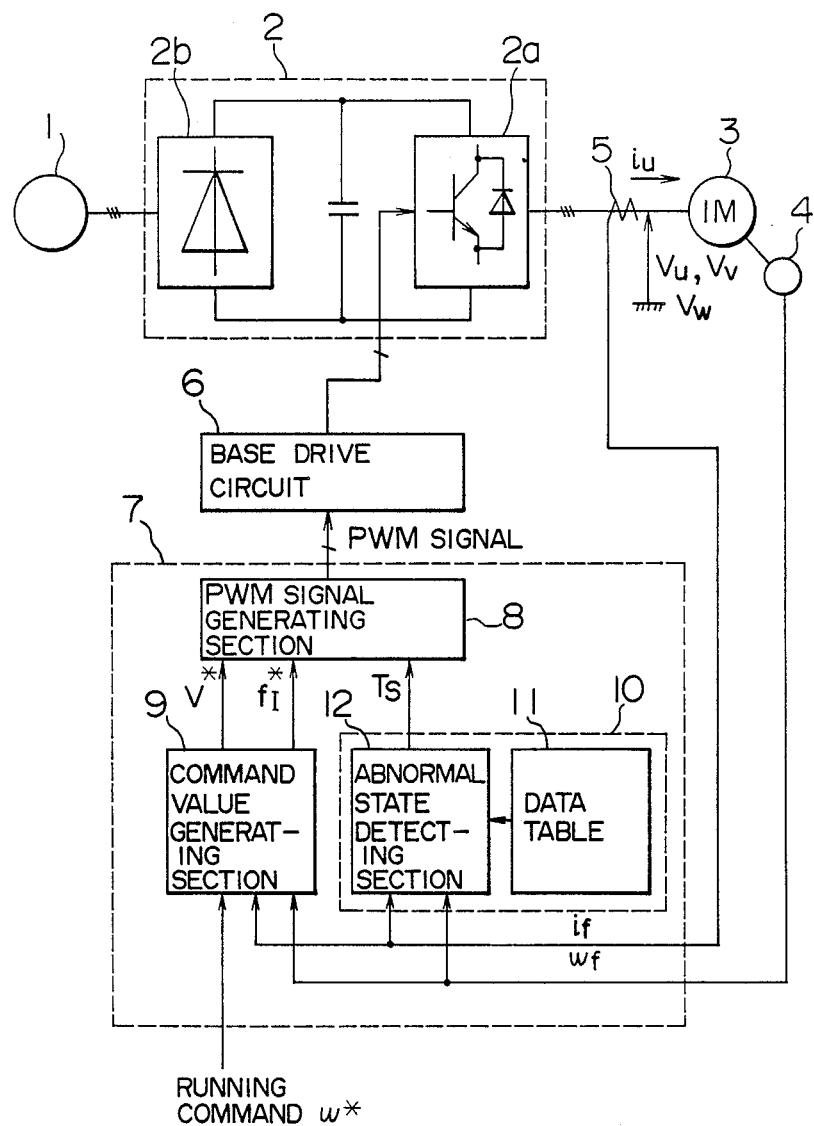
FIG. 1 is a circuit configuration diagram of a control apparatus of an inverter for driving an AC motor according to an embodiment of the present invention.

FIG. 1 is a circuit configuration diagram of a control apparatus of an inverter for driving an AC motor according to an embodiment of the present invention.

In FIG. 1, numeral 1 denotes a commercial three-phase AC power source, and numeral 2 denotes an inverter apparatus comprising an inverter section 2a and a converter section 2b. This inverter apparatus 2 is supplied with the output of the commercial three-phase AC power source 1 and outputs three-phase AC having voltages $V_u$, $V_v$ and $V_w$ and a frequency $f_1$ to drive a three-phase induction motor 3. Numeral 4 denotes a tachometer generator, 5 a current detector, 6 a base drive circuit, and 7 a control circuit. This control circuit 7 comprises a PWM signal generating section 8, a command value generating section 9, and a sampling period control section 10 which in turn comprises a data table 11 and an abnormal state detecting section 12.

When a motor speed command $\omega^*$ is inputted to the control circuit 7 as a running command, the command value generating section 9 calculates and outputs a voltage command value $V^*$ and an inverter frequency command value $f_f^*$ on the basis of a detected current value $i_f$ and a detected speed value $\omega_f$ detected respectively by the current detector 5 and the tachometer generator 4. This command value generating section 9 is provided to calculate a torque, which should be applied to the motor in order to correct the deviation of the motor speed $\omega_f$ from the command value $\omega^*$, on the basis of the above described deviation and the detected current value $i_f$ and then calculate the voltage command $V^*$ and the frequency command value $f_f^*$ corresponding to the torque. As this command value generating section 9, a circuit as shown in 1988 National Convention Record, IEE of Japan -Industry Application Society- Report No. 74, for example, is used. Upon receiving these command values, the PWM signal generating section 8 generates a PWM signal. This PWM signal is supplied to respective switching devices included in the inverter section 2a via the base drive circuit 6.

Figure 2:
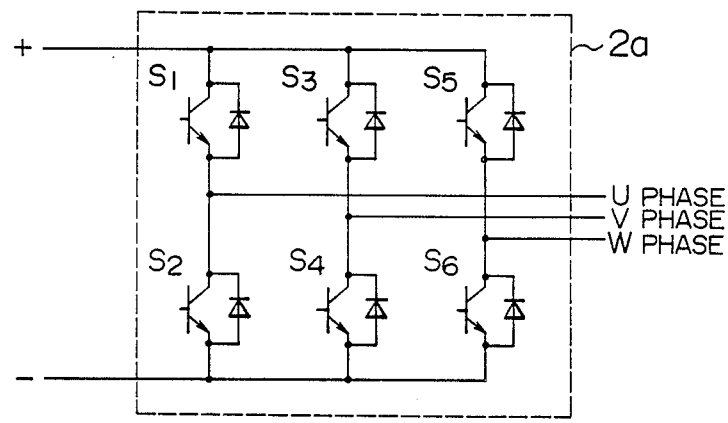
FIG. 2 is a circuit configuration diagram of an inverter section.

FIG. 2 is a circuit configuration diagram of the inverter section 2a. FIGS. 3A to 3D are diagrams for illustrating the operation of the inverter section 2a. The method for generating the PWM signal will now be described by referring to FIGS. 2 and 3A to 3D.

As switching states of switching devices $S_1$ to $S_6$ of the inverter section 2a, there are eight combinations, i.e., (0, 0, 0), (1, 0, 0), (1, 1, 0), (0, 1, 0), (0, 1, 1), (0, 0, 1), (1, 0, 1) and (1, 1, 1). Each set represents successively states of switching devices of phases U, V and W. In each set, "1" represents a state under which a switching device of positive side of one phase is conducting and a switching device of negative side of the phase is nonconducting, whereas "0" represents a state under which a switching device of positive side of one phase is nonconducting and a switching device of the phase is conducting.

Figure 3A:
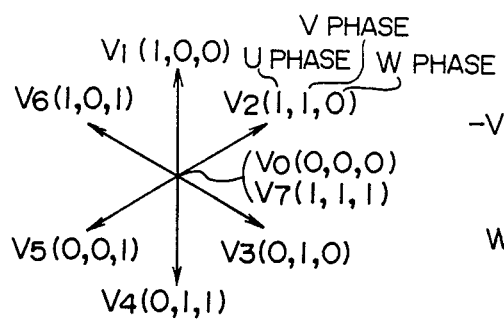
FIGS. 3A to 3D are diagrams for illustrating the operation of the inverter section.
Figure 3B:
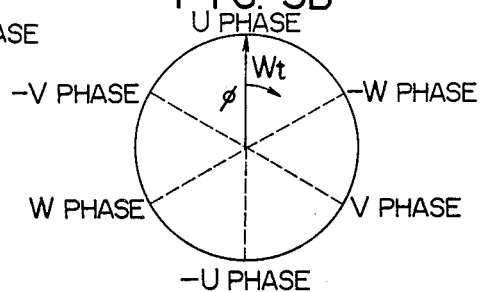
Figure 3C:
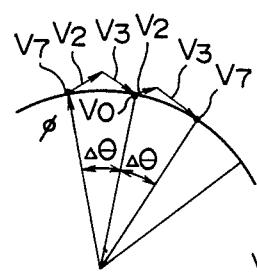
Figure 3D:
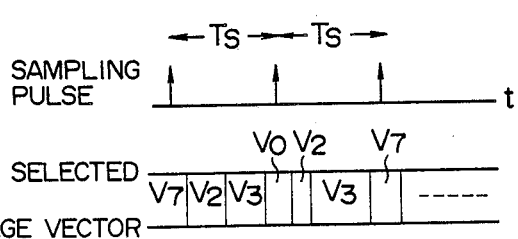

Voltage vectors $V_0$ to $V_7$ corresponding to these states become as shown in FIG. 3A. In case the output voltage is sinusoidal, a vector $\phi$ of magnetic flux generated by a stationary primary winding of the three-phase induction motor 3 so as to make interlinkage with a rotary secondary winding or a rotary cage conductor draws a circle rotating with an angular velocity $\omega$ as shown in FIG. 3B. In an angle $\Delta\theta$ over which the interlinkage magnetic flux vector $\phi$ advances during a sampling period $T_s$, the voltage vectors $V_0$ to $V_7$ are selected so that the magnetic flux vector may change along a circle drawn by the interlinkage magnetic flux vector $\phi$. In case the voltage vectors are selected as $V_7$-$V_2$-$V_3$-$V_0$-$V_2$-$V_3$-$V_7$ as shown in FIG. 3C, for example, relations between sampling pulses and voltage vectors become as shown in FIG. 3D. Therefore, a PWM signal corresponding to a switching state associated with each voltage vector is outputted from the PWM signal generating section 8.

FIGS. 4(a) to 4(d) are waveform diagrams showing the sampling pulse, voltage vector, output voltage and output current.

Figure 4:
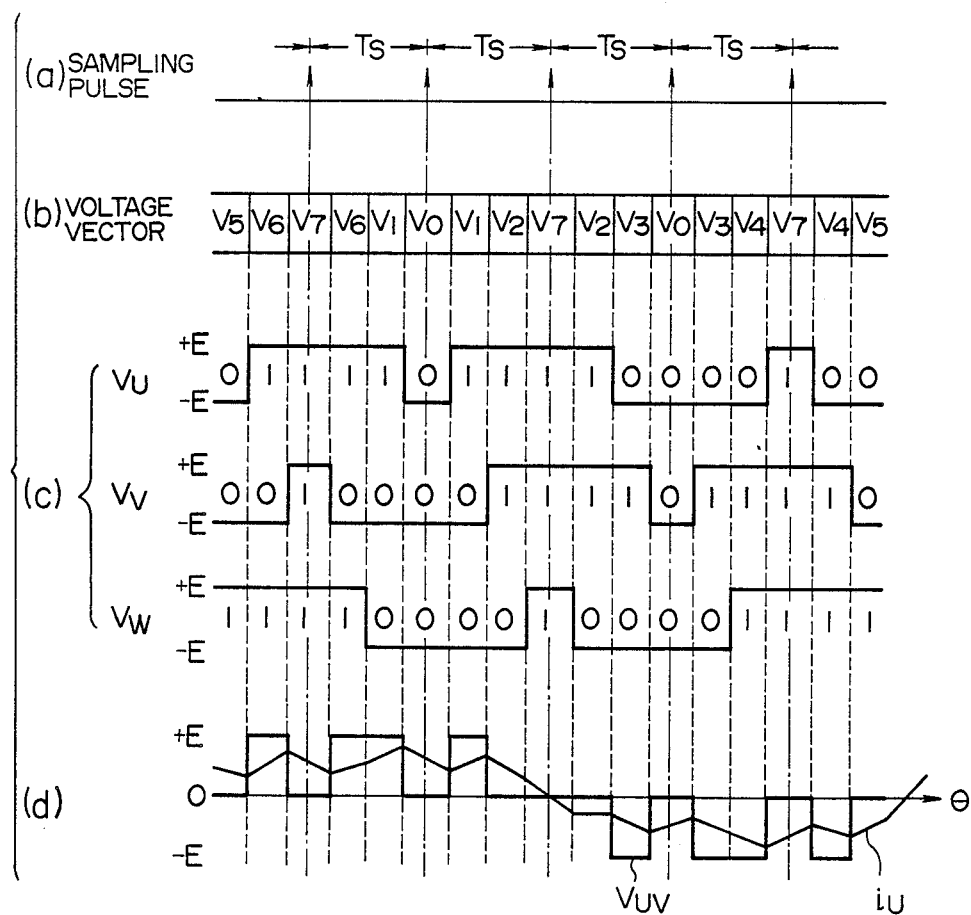
FIG. 4 is a waveform diagram showing sampling pulses, voltage vectors, output voltage and output current.

In case voltage vectors as shown in FIG. 4(b) are selected in one period of the inverter operation, output phase voltages $V_U$, $V_V$, and $V_W$, and output line voltage $V_{UV}$ become as shown in FIGS. 4(c) and 4(d). Therefore, the U-phase current $i_U$ of the motor 3 becomes as shown in FIG. 4(d), and the period of current ripple is substantially in proportion to the sampling period $T_s$. This current ripple causes electromagnetic vibration of the stator core of the motor 3, resulting in noises. In this way, noises having a frequency nearly equivalent to the frequency of the current ripple, i.e., the sampling frequency ($1/T_s$) are generated.

On the other hand, the period $T_s$ of the sampling pulse is defined by the sampling period control section 10. The abnormal state detecting section 12 always monitors the detected current value $i_f$ and the detected speed value $\omega_f$ by comparing them with their limit values respectively set. Under a normal running state with respective detected values less than limit values, the abnormal state detecting section 10 outputs the constant sampling period $T_s$.

Figures 5, 6:
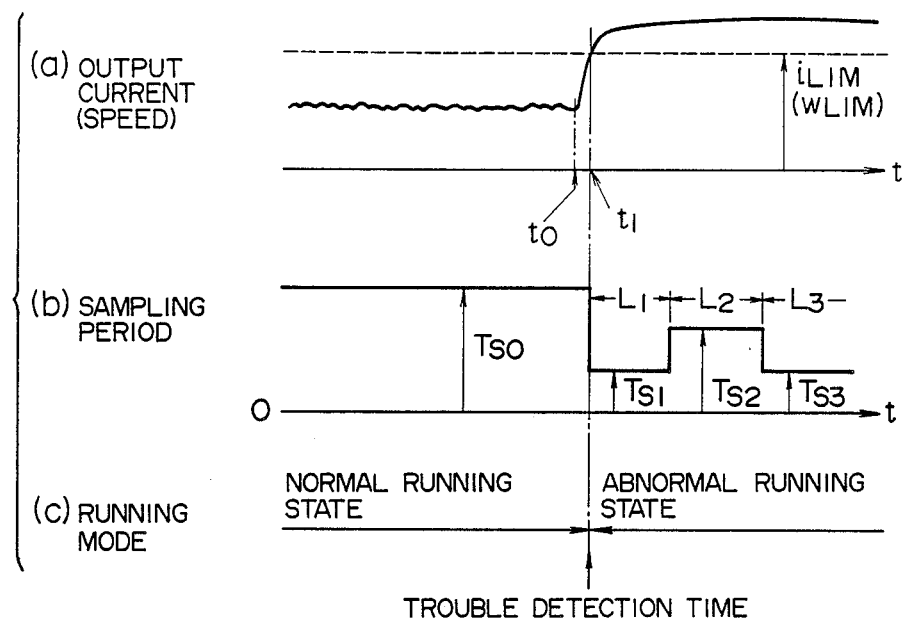
FIG. 5 is a diagram for illustrating the operation caused when an abnormal running state occurs.
FIG. 6 is a diagram for illustrating contents of a data table.

It is now assumed that a trouble occurs at time as shown in FIG. 5 and the detected current value $i_f$ or the detected speed value $\omega_f$ exceeds a current limit value $i_{LIM}$ or a speed limit value $\omega_{LIM}$ at time $t_1$ as shown in FIG. 5(a). When overcurrent in the output current or overspeed of the motor is thus detected, the succeeding sampling period $T_s$ is changed. For example, a sampling period $T_{s0}$ under the normal running state is changed successively to sampling periods $T_{s1}$, $T_{s2}$, $T_{s3}$ and so on under the abnormal running state as shown in FIG. 5(b). It is now assumed that durations of these sampling periods are $L_1$, $L_2$, $L_3$ and so on. As a result, the frequency of the electromagnetic vibration tone generated from the motor changes from nearly $1/T_{s0}$ successively to nearly $1/T_{s1}$, $1/T_{s2}$, $1/T_{s3}$ and so on. Therefore, it is possible to inform of the abnormal running state by such a change in electromagnetic vibration tone.

In order to change the sampling period from that of the normal running state to that of the abnormal running state, the sampling period control section 10 is provided. As shown in FIG. 6, the sampling periods $T_{s1}$, $T_{s2}$, $T_{s3}$, - - -, $T_{sn}$ under the abnormal running state are so stored into the data table 11 as to be associated with their durations $L_1$, $L_2$, $L_3$, - - -, $L_n$. When the abnormal running state is detected, these data are called by the abnormal state detecting section 12. The sampling period $T_{s0}$ under the normal running state is changed successively to sampling periods $T_{s1}$, $T_{s2}$ and so on under the abnormal running state and outputted. Durations $L_1$, $L_2$, - - -, $L_n$ have such length that the human ear can distinguish the tone change, and are preferably 100 ms to several seconds.

Figure 7:
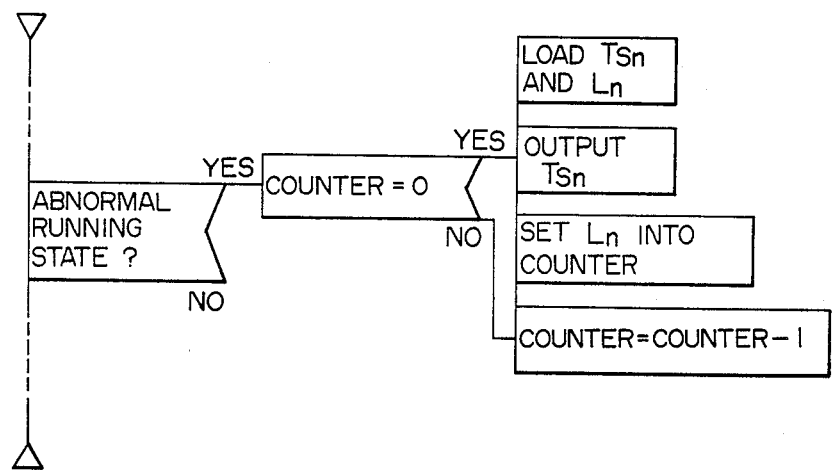
FIG. 7 is a flow chart for illustrating contents of processing performed when an abnormal running state occurs.

The processing heretofore described is performed by using a microcomputer. The flow of this processing is shown in FIG. 7.

When an abnormal running state is detected, data $T_{sn}$ and $L_n$ are first loaded from the data table 11, and the sampling period is changed from $T_{s0}$ to $T_{sn}$. The duration $L_n$ is set into a counter, which is a register (not illustrated) provided in the PWM signal generating section 8. The sampling period remains at $T_{sn}$ until $L_n$ is successively decreased to reach zero. That is to say, the frequency of the electromagnetic vibration tone of the motor is maintained at nearly $1/T_{sn}$ during $L_n$. When the count reaches zero, the next data is loaded. An electromagnetic tone having a frequency corresponding to its sampling period is maintained for its duration. In the same way, the frequency of the electromagnetic vibration tone is hereafter changed according to the data stored in the data table.

When an abnormal running state is detected in this embodiment, an alarm informing of this fact can be conveyed as a tone change by using an electromagnetic vibration tone generated from the motor. Therefore, it is not necessary to specially provide a display device or an alarm device for informing of the abnormal running state unlike the prior art. As a result, the apparatus can be provided at a lower cost.

Figure 8:
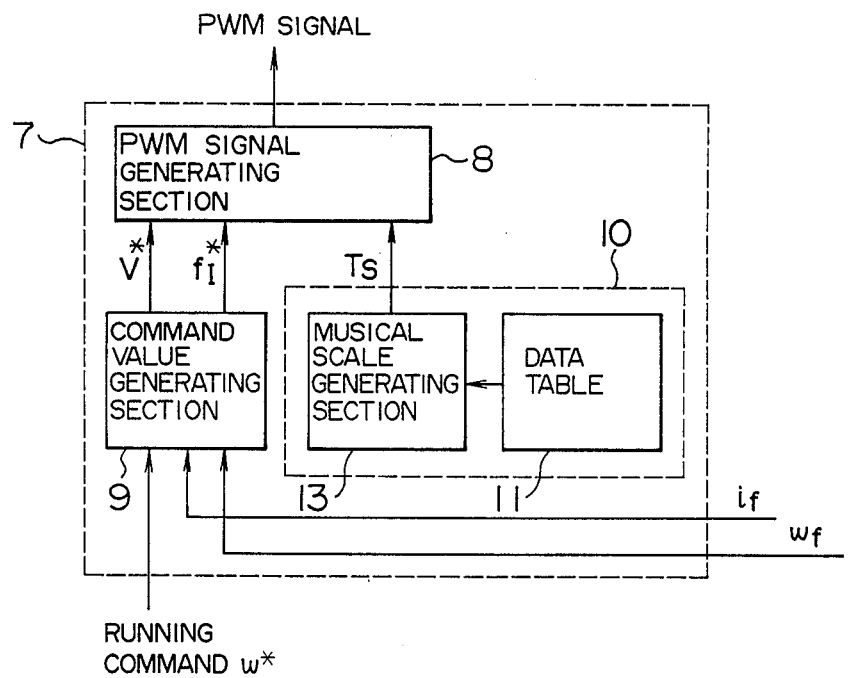
FIG. 8 is a configuration diagram of a control circuit showing another embodiment.

FIG. 8 shows another embodiment of the present invention. FIG. 8 is a configuration diagram of a control circuit capable of producing a musical sound at the normal running state of the motor.

The sampling period control section 13 included in the control circuit 7 comprises the data table 11 and a musical scale generating section 13. If data of the sampling period $T_s$ stored in the data table 11 is so set as to be limited to one period of the frequency of each musical interval of the musical scale included in music, it is possible to make the electromagnetic vibration tone of the motor nearly equivalent to the frequency of each musical interval of the musical scale.

Figures 9, 10:
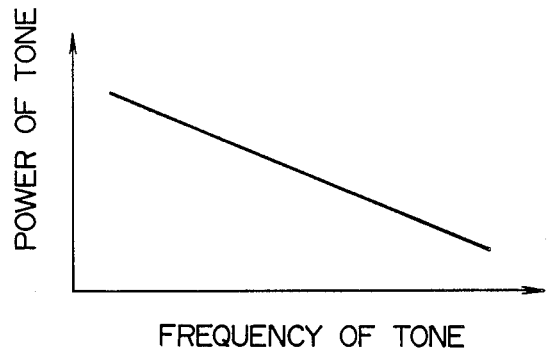
FIG. 9 is a diagram showing relationship between musical interval and frequency.
FIG. 10 is a characteristic diagram showing power spectrum distribution with respect to tone frequency.

FIG. 9 shows relationship between musical interval and frequency. For example, reference tone (la) has a frequency of 440 Hz, and (la) higher than that by one octave has a frequency of 880 Hz. By dividing the interval between them into twelve sections in accordance with the frequency ratios shown in FIG. 9, frequencies of respective musical intervals are defined. By setting the reciprocal of each frequency as data of the sampling period $T_s$ and changing the duration $L_n$ of each musical interval in proportion to the length of the note, therefore, it is possible to play music by using electromagentic vibration tones of the motor.

By using the present embodiment, it becomes possible to change electromagnetic vibration tones of the motor, which have heretofore been noises offensive to the ear, into music.

Assuming now that the voltage is constant in the present embodiment, the power of the electromagnetic vibration tone of the motor becomes large at lower frequencies and small at higher frequencies. On the other hand, it is known that power spectrum distribution of comfortable tone with respect to frequency has large power in a low frequency region and has small power in a high frequency region as shown in FIG. 10. Therefore, it is known that the power spectrum distribution of FIG. 10 is also attained by making the electromagnetic vibration tones music as in the present embodiment, resulting in comfortable feeling.

Figure 11:
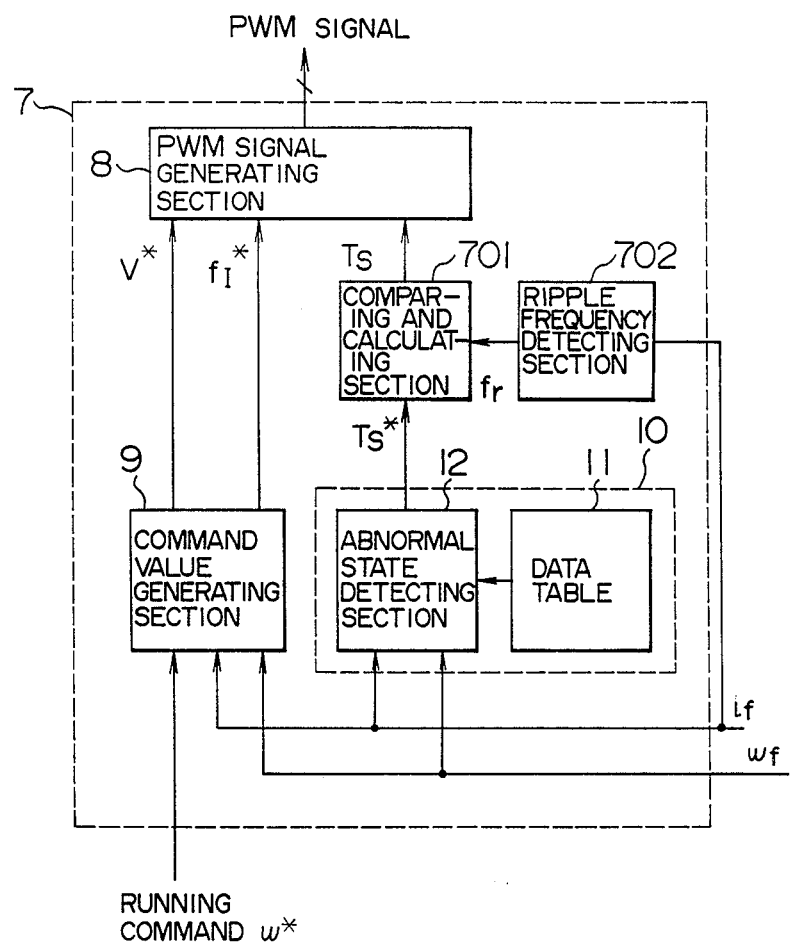
FIGS. 11 to 15 are diagrams showing other embodiments.
Figure 12:
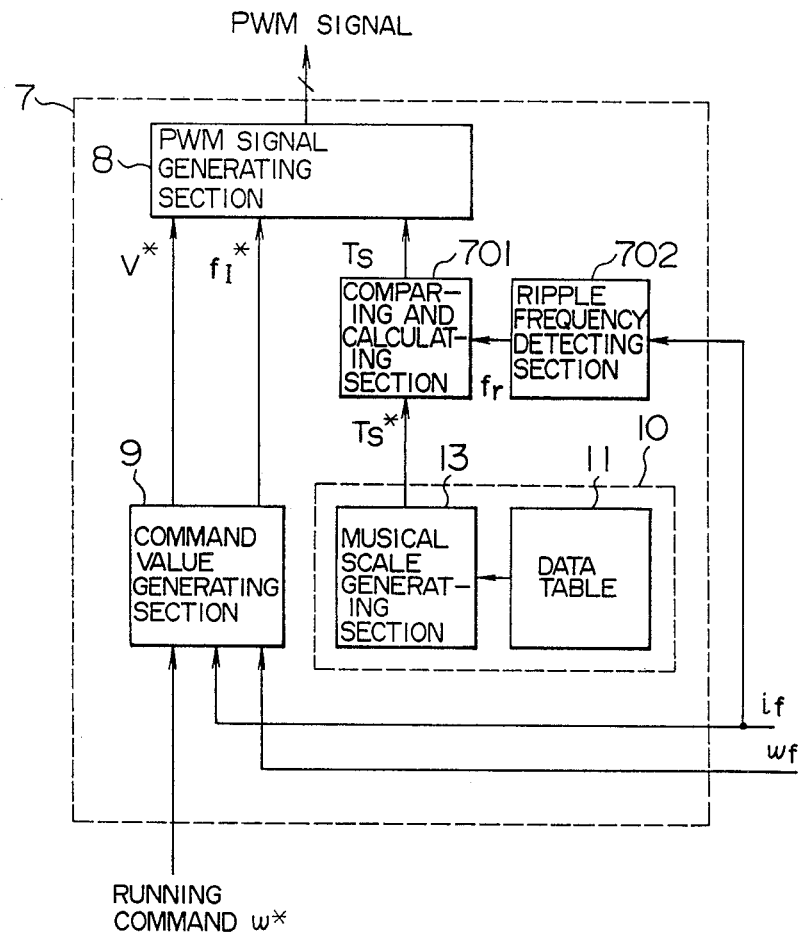

FIGS. 11 and 12 show other embodiments of the present invention. In the examples shown in FIGS. 11 and 12, the ripple frequency of the motor current is directly detected, and the sampling period is so changed as to attain the desired ripple frequency. The command value $T_s^*$ of the sampling period is supplied from the abnormal state detecting section 12 shown in FIG. 11 or the musical scale generating section 13 to a comparing and calculating section 701. On the basis of the command value $T_s^*$ of the sampling period thus supplied and a ripple frequency $f_r$ supplied from a ripple frequency detecting section 702, the comparing and calculating section 701 performs the following proportion calculation and integration to derive the sampling period $T_s$.

$$\begin{cases} \Delta f_r = \frac{1}{T_s^*} - f_r \\ \frac{1}{T_s} = K_p \Delta f_r + K_I \int \Delta f_r dt \end{cases}$$

$K_P$ and $K_I$ are proportion constant and integration constant, respectively. In the present embodiment, the precision in setting the ripple frequency of the motor current becomes high. It is thus possible to set the frequency of the electromagnetic tone generated from the motor at a predetermined value with higher precision so much.

Figure 13:
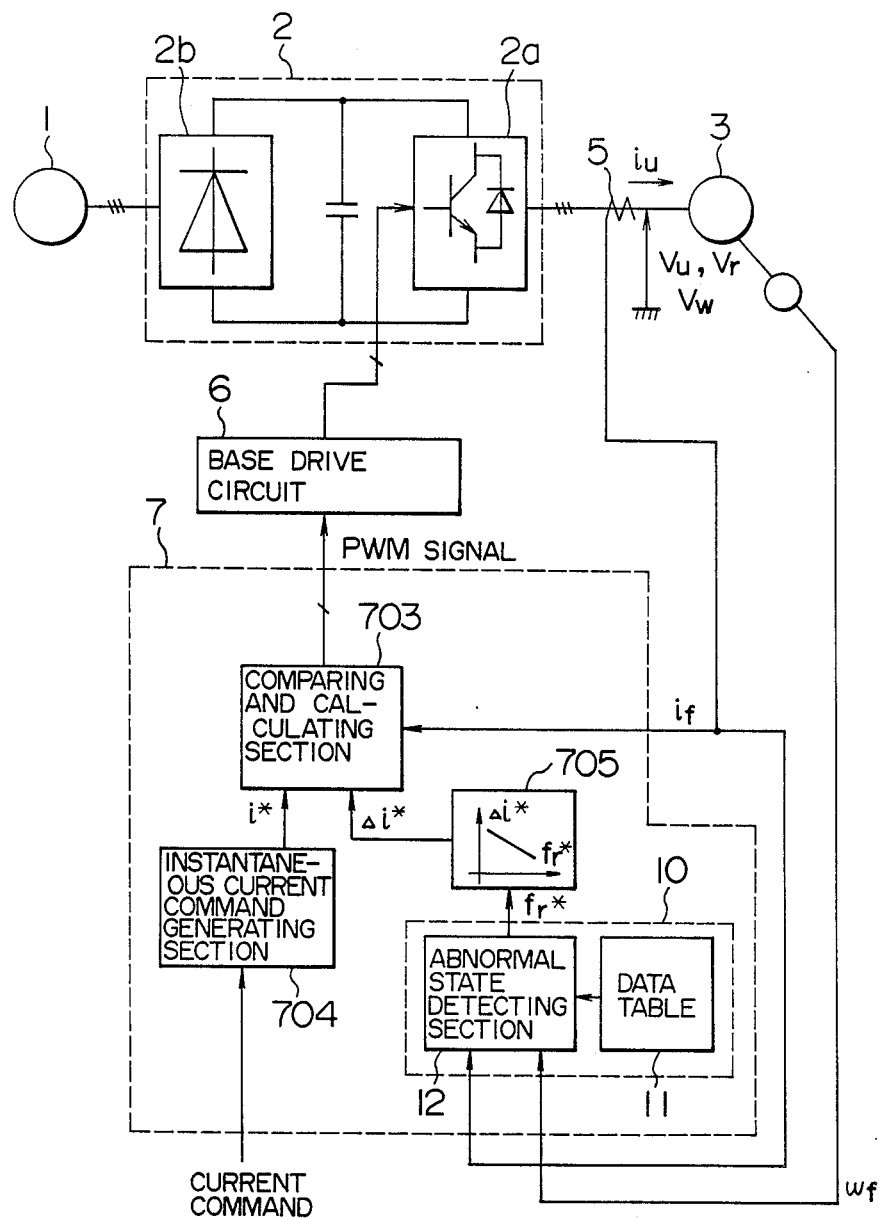
Figure 14:
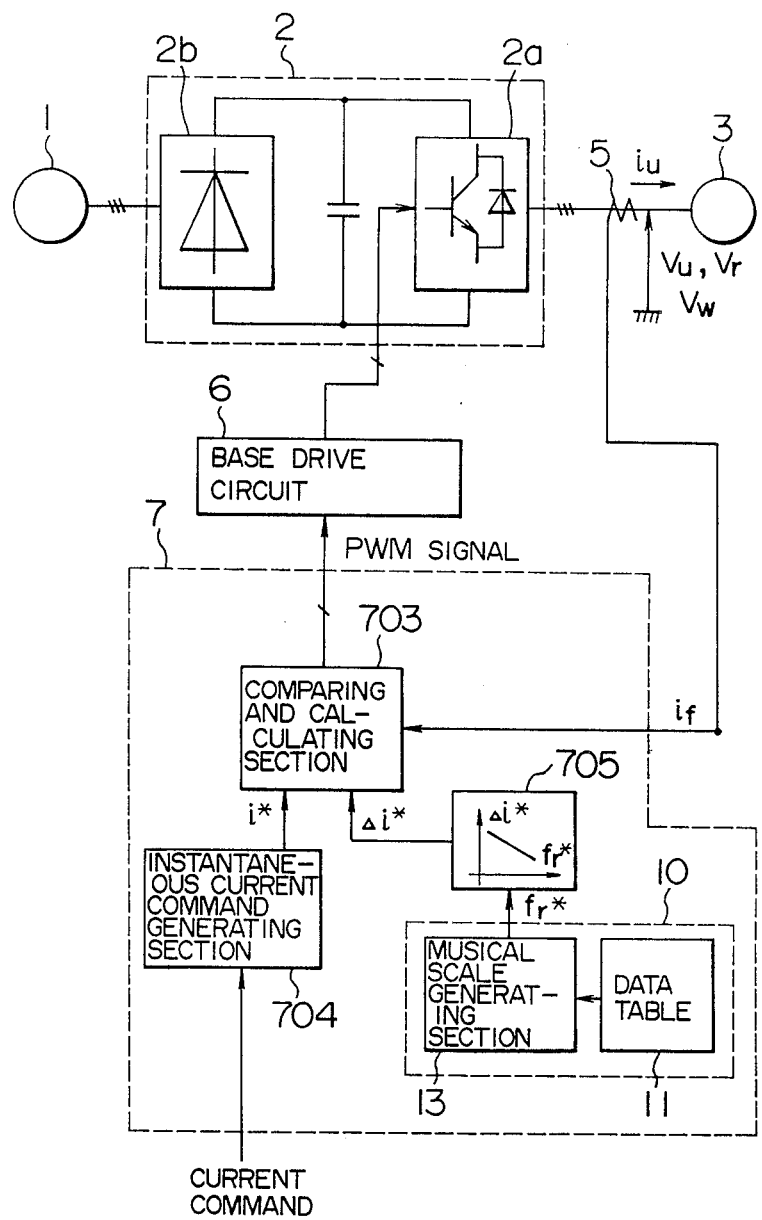
Figure 15:
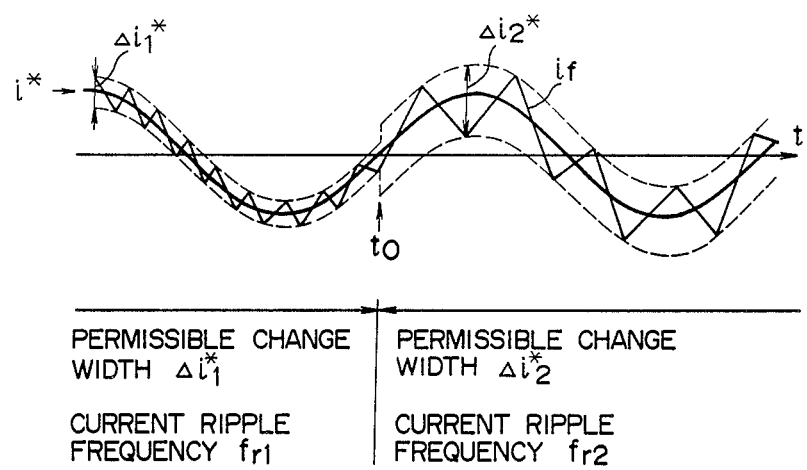

FIGS. 13 and 14 show other embodiments of the present invention. The command value $$f_r^* \left( = \frac{1}{T_s^*} \right)$$

of the current ripple frequency outputted from the sampling period control section 10 is inputted to a function generating section 705, which in turn outputs a permissible change width $\Delta i^*$ of current ripple. A comparing and calculating section 703 applies comparison and calculation to an instantaneous current command value $i^*$ outputted from an instantaneous current command generating section 704, the detected motor current value $i_f$, and the $\Delta i^*$ to derive the PWM signal. Assuming now that the permissible change width of current ripple with respect to the instantaneous current command value $i^*$ is changed from $\Delta i_1^*$ to $\Delta i_2^*$ at time $t=t_0$ as shown in FIG. 15, the frequency of current ripple is changed from $f_{r1}$ to $f_{r2}$. If $\Delta i_1^* < \Delta i_2^*$, the relation $f_{r1} > f_{r2}$ generally holds true. By controlling $\Delta i^*$ according to this relation, the ripple frequency $f_r$ of the motor current $i_f$ can be made equal to the desired value $f_r^*$.

FIG. 16 shows another embodiment of the present invention. FIG. 16 is a circuit configuration diagram showing the case where the present invention is applied to a multi-inverter apparatus.

An inverter apparatus 20 comprises a plurality of unit inverters 20a to 20n run so as to have running phases shifted by (180°/3n) respectively. Their output voltages are summed up by a multiple transformer 30. The resultant voltage is supplied to a three-phase induction motor 3 to drive the motor 3. Although not especially illustrated, each unit inverter is associated with a circuit equivalent to the control circuit shown in FIG. 1. Sampling periods and their durations as shown in FIG. 17 stored beforehand into data tables 40a to 40n respectively associated with the unit inverters 20a to 20n. By doing so, the electromagnetic vibration tone generated from the motor 3 becomes a compound of frequencies nearly equivalent to sampling frequencies of the unit inverters.

In the present embodiment, the information tone generated as the electromagnetic vibration tone when an abnormal running state has been detected can be made more complex than that of the above described embodiments. If a combination of frequencies to be composed is made to agree with frequency components of voice, for example, the information tone can be changed to a voice message such as a message "overspeed has occurred in the motor" to inform of the abnormal running state more clearly.

Figure 18:
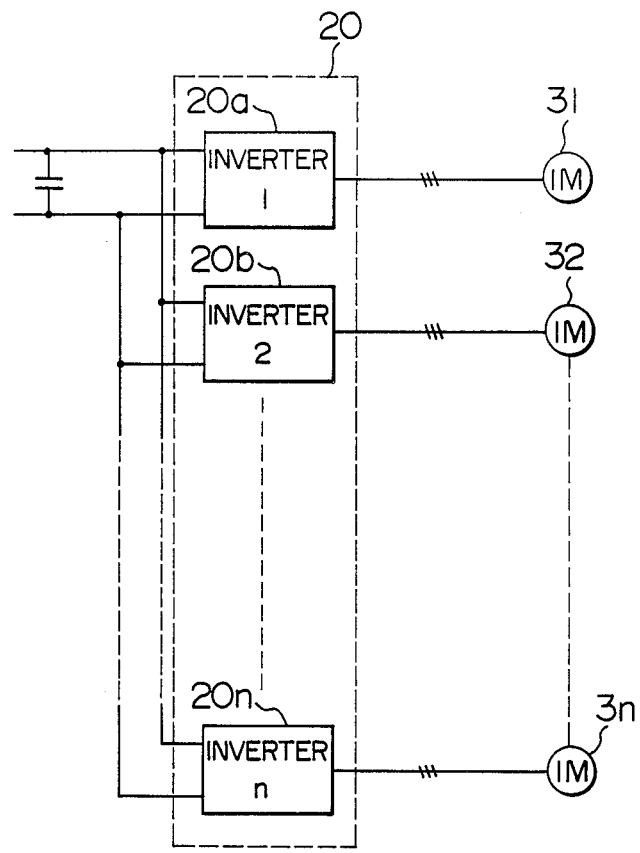

By combining this embodiment with the embodiment shown in FIG. 8, it becomes possible to generate a chord as the electromagnetic vibration tone, resulting in more comfortable music. In case a plurality of motors are run in parallel, a similar effect can be obtained by using configuration as shown in FIG. 18.

If the present invention is applied to house hold appliances using a PWM inverter drive motor system, it is possible to use effectively the electromagnetic vibration tones as an alarm, a message or BGM (background music), resulting in favorable feeling of use without noises.

Further, if the present embodiment is applied to a plant system using a PWM inverter drive motor system, it becomes possible to use effectively the electromagnetic vibration tones especially as an alarm when abnormality occurs in the system.

We claim:
1. A control apparatus for controlling a PWM inverter, said PWM inverter receiving AC power and generating an AC output having a controlled frequency to be supplied to an AC motor, said control apparatus comprising:
   first means for generating, on the basis of a given running command, a PWM signal controlling said inverter with a given sampling period; and
   second means for controlling said first means, whereby said AC motor generates an electromag- netic tone preselected so as to correspond to desired information when said AC motor is driven by output of said inverter controlled by said PWM signal.

2. A control apparatus according to claim 1, wherein said second means controls said first means so as to control ripple contained in a motor current flowing through said AC motor when said AC motor is driven by the output of said inverter controlled by said PWM signal.

3. A control apparatus according to claim 2, wherein said second means comprises means for detecting ripple frequency of said motor current, and means for controlling said first means so that said detected ripple frequency may become a selected value.

4. A control apparatus according to claim 2, wherein said second means comprises means for detecting amplitude of ripple current of said motor current, and means for controlling said first means so that change width of said detected ripple current amplitude may be within a selected range.

5. A control apparatus according to claim 2, wherein the ripple of said motor current is controlled by controlling said sampling period or frequency.

6. A control apparatus according to claim 5, wherein said second means comprises means for detecting the ripple frequency of said motor current, and said sampling period or frequency is controlled so that said detected ripple frequency may become a selected value.

7. A control apparatus according to claim 5, wherein said second means comprises means for detecting amplitude of ripple current of said motor current, and said sampling period or frequency is controlled so that change width of said detected ripple current amplitude may be within a selected range.

8. A control apparatus according to claim 5, wherein said sampling frequency is so controlled as to become lower as power of the electromagnetic tone of said motor is increased.

9. A control apparatus according to claim 5, wherein said second means comprises a table for specifying predetermined values of various sampling periods and their durations, and said sampling period and its duration used for ripple control of said motor current are controlled in accordance with the values of said sampling period and their durations.

10. A control apparatus according to claim 5, wherein said second means comprises memory means for storing therein beforehand a change pattern of the sampling period corresponding to said desired information, and said sampling period is so controlled as to change in accordance with said pattern of the sampling period stored in said memory means.

11. A control apparatus according to claim 10, wherein said sampling period is so controlled as to change in accordance with a change pattern preselected corresponding to changes of musical intervals constituting selected music in order to represent said desired information by said selected music.

12. A control apparatus according to claim 10, wherein said memory means stores therein values of the sampling period changing in accordance with said change pattern of the sampling period and their durations, and said sampling period is controlled so as to successively change in accordance with said stored values of the sampling period and durations associated with said stored values.

13. A control apparatus according to claim 12, wherein the values of said sampling period and their durations correspond to changes of musical intervals included in selected music in order to represent said desired information by said selected music.

14. A control apparatus for controlling a PWM inverter, said PWM inverter receiving AC power and generating an AC output having a controlled frequency to be supplied to an AC motor, said control apparatus comprising:

first means for generating, on the basis of a given running command, a PWM signal controlling said inverter with a given sampling period; and second means for controlling said first means, whereby said AC motor generates an electromagnetic tone having rhythm so predetermined as to represent the running state of said motor or load connected to said motor when said AC motor is driven by output of said inverter controlled by said PWM signal.

15. A control apparatus according to claim 14, wherein the running state of said motor or its load comprises an abnormal state of said motor or its load.

16. A control apparatus according to claim 14, wherein the rhythm of said electromagnetic tone representing the running state of said motor or its load comprises a message tone informing of said running state.

17. A control apparatus for controlling a PWM inverter, said PWM inverter receiving AC power and generating an AC output having a controlled frequency to be supplied to an AC motor, said PWM inverter comprising a plurality of PWM inverter units, said control apparatus comprising:

first means provided for each of said inverter units, said first means generating, on the basis of a given running command, a PWM signal for controlling said associated inverter unit with a given sampling period; and second means for controlling the value of the sampling period and its duration so as to change said sampling period in said first means of each of said inverter units in accordance with a predetermined pattern, whereby said AC motor generates an electromagnetic tone preselected to correspond to desired information when said AC motor is driven by a compound of outputs of said plurality of PWM inverter units controlled by said PWM signals, which are generated by said respective first means.

18. A control apparatus according to claim 17, wherein said second means comprises detecting means for detecting an abnormal state of said motor, and the value of said sampling period and its duration of each of said inverter units are so controlled that said electromagnetic tone generated by said motor may become a predetermined alarm tone when said abnormal state is detected.

19. A control apparatus according to claim 18, wherein said alarm tone comprises a voice message for giving an alarm for said abnormal state, and the value of said sampling period and its duration of each of said inverter units are so controlled that the electromagnetic tone of said motor may represent said voice message.

20. A control apparatus according to claim 17, wherein said desired information comprises selected music, and the value of the sampling period and its duration are controlled so that said sampling period in said first means of each of said inverter units may change in accordance with a pattern predetermined to correspond to the change of musical intervals of said selected music.

21. A control apparatus according to claim 17, wherein said second means of each of said inverter units comprises a table for specifying predetermined values of various sampling periods and their durations, and said sampling period in said first means of each of said inverter units is controlled in accordance with the value of said sampling period and its duration stored in said table of said second means associated therewith.

22. A motor drive system comprising:
 a PWM inverter receiving AC power and generating an AC output having a controlled frequency to be supplied to an AC motor connected to a load;
 first means for generating, on the basis of a given running command, a PWM signal controlling said inverter with a given sampling period; and
 second means for controlling said first means, whereby the electromagnetic tone generated by said AC motor is selectively changed when said AC motor is driven by the output of said inverter.

* * * * *